Figure 1:
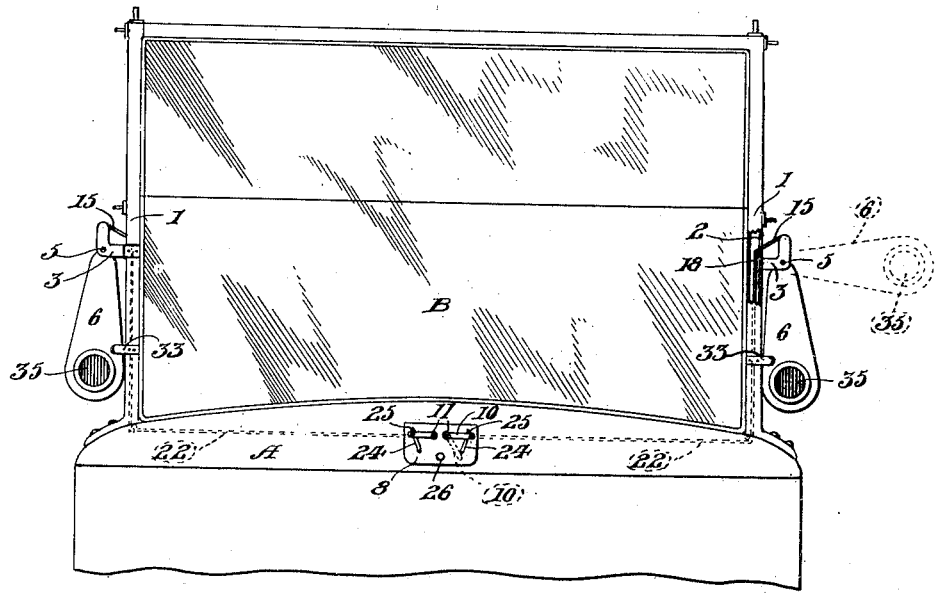

M. A. JASZEWSKI.
AUTOMOBILE SIGNAL.
APPLICATION FILED DEC. 8, 1919.

1,373,738.

Patented Apr. 5, 1921.
3 SHEETS—SHEET 1.

Inventor
M. A. Jaszewski

By A. M. Wilson
Attorney

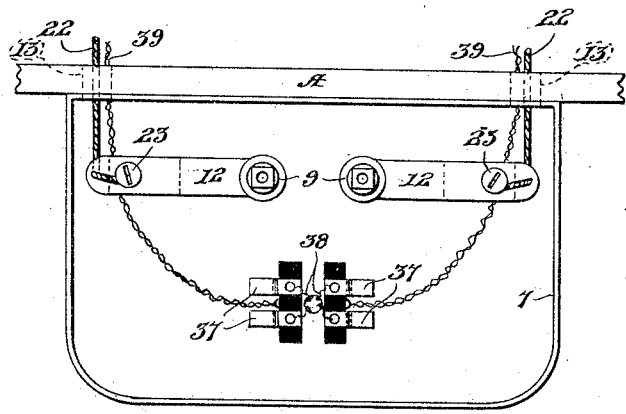
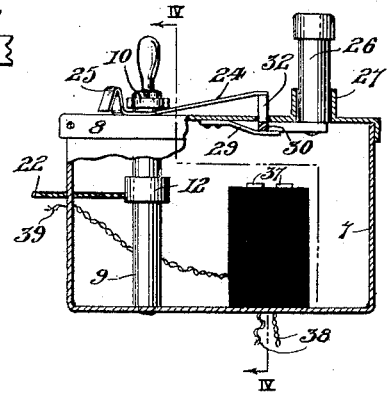
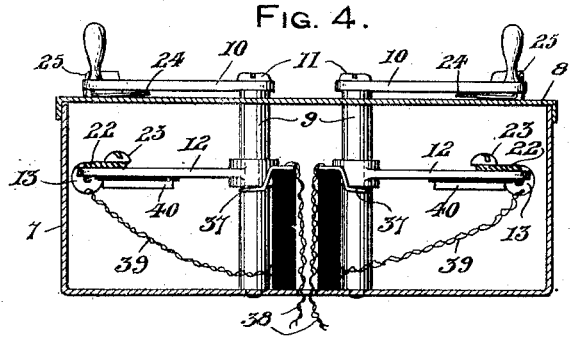
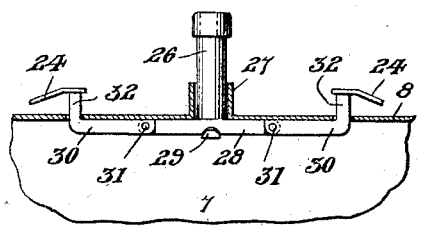
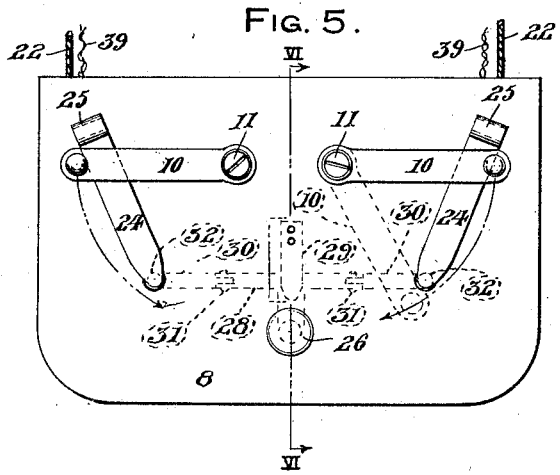
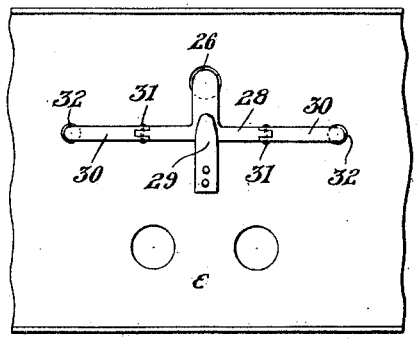

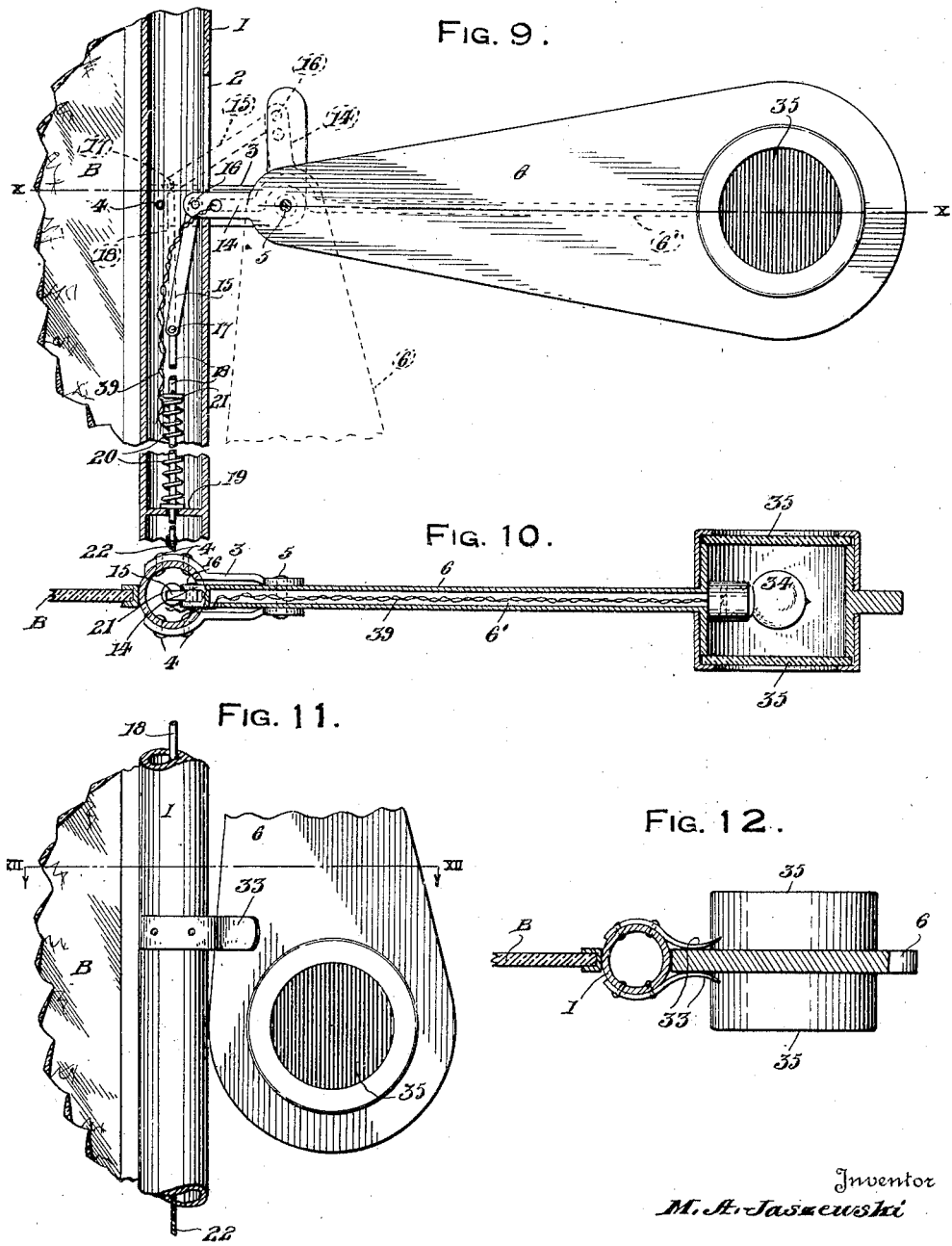

UNITED STATES PATENT OFFICE.

MARYAN A. JASZEWSKI, OF BETHLEHEM, PENNSYLVANIA.

AUTOMOBILE-SIGNAL.

1,373,738.  Specification of Letters Patent.  Patented Apr. 5, 1921.

Application filed December 8, 1919. Serial No. 343,169.

*To all whom it may concern:*

Be it known that I, MARYAN A. JASZEWSKI, a citizen of Poland, residing at Bethlehem, in the county of Northampton and State of Pennsylvania, have invented new and useful Improvements in Automobile-Signals, of which the following is a specification.

The primary object of the present invention resides in the provision of a signal designed for attachment to an automobile or like motor vehicle and being operable during day and night for signaling the direction in which the vehicle is to turn in advance of such operation.

A further object of the invention is to provide a signal device for motor vehicles to indicate the direction of turning of the vehicle in advance of the actual operation thereof, the signaling device including an arm adapted to be shifted to indicate the direction of turning and with electrical devices associated with said arm and fed from the main storage batteries of the automobile for providing an illumination in connection with the signaling arm when the device is used during darkness.

With the above and other objects in view, this invention consists in the novel form, combination and arrangement of parts herein fully described, and shown in the accompanying drawings, wherein like reference characters indicate similar parts throughout the several views.

Figure 2:
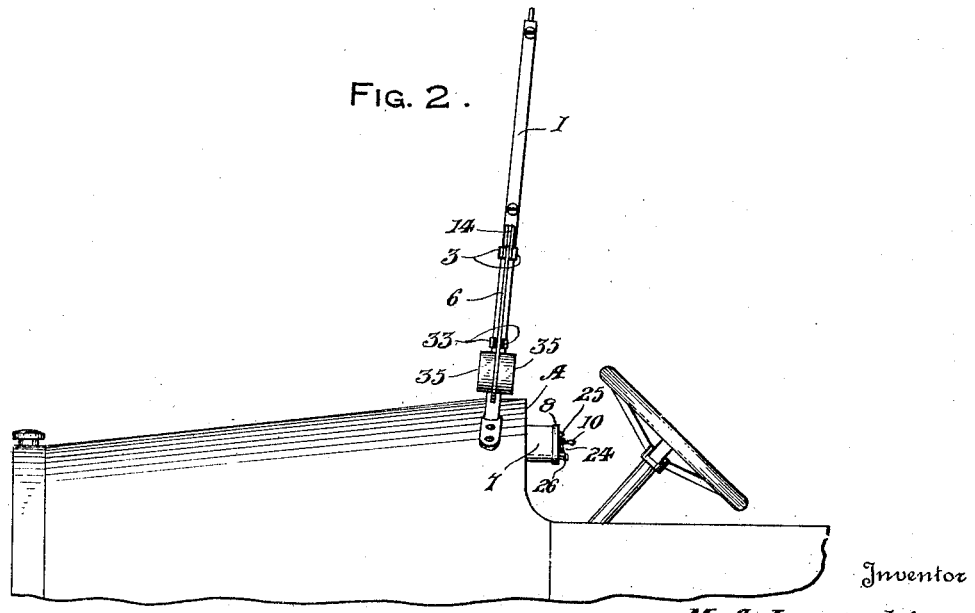

In the drawings,

Figure 1 is a fragmentary view of the front portion of an automobile showing the instrument board and windshield with the present invention in operative position upon the windshield, Fig. 2 is a side elevational view of the construction shown in Fig. 1, Fig. 3 is a top plan view with the cover removed of the box for containing the operating mechanism of the signal, Fig. 4 is a vertical longitudinal sectional view taken through the casing, Fig. 5 is a top plan view of the casing showing the separate arms for independently operating each signal arm, Fig. 6 is a cross sectional view taken on line VI—VI of Fig. 5, Fig. 7 is a fragmentary view of the push pin releasing means for the signal operating arms, Fig. 8 is a bottom plan view of a portion of the casing cover, Fig. 9 is an enlarged fragmentary sectional view of a portion of the windshield rail and the signal arm, Fig. 10 is a cross sectional view taken on line X—X of Fig. 9 showing the tubular passage in the signal arm inclosing the circuit wires, Fig. 11 is a fragmentary front elevational view of a portion of the signaling arm and windshield showing the devices for maintaining the signal arm stationary, and Fig. 12 is a cross sectional view taken on line XII—XII of Fig. 11.

Referring more in detail to the accompanying drawings and particularly to Figs. 1 and 2, there is illustrated an automobile embodying in part an instrument board A and a windshield B.

As shown more clearly in Figs. 1, 2, and 9 to 12, the side rails 1 of the windshield B are of tubular construction, and being of like formation, only one of the side rails will be described, the same having a longitudinal slot 2 formed in the outer side thereof as illustrated in Fig. 9. A pair of reversed L-shaped brackets 3 are clamped as at 4 upon opposite sides of the post 1, and pivotally mounted upon the pin 5 extending between the L-shaped guide brackets 3 is a signal arm 6 guided in its movements by the brackets guides 3 as will be clearly evident from an inspection of Figs. 1 and 9. The mechanism for shifting the signal arms from their normally vertical position to their operative indicating position as shown by dotted lines in Fig. 1, includes a casing 7 secured to the instrument board A of the vehicle and having a removable cover 8 mounted thereon. A pair of spaced vertical posts 9 are journaled within the casing 7 and extend through the cover 8 thereof with operating handles 10 fixed upon the upper ends of the posts by the screws 11. Secured to each post 9 within the casing 7 is an arm 12 movable with the post and having the free end thereof moving in proximity of the alined openings 13 in the casing 7 and instrument board A.

An arm 14 carried by the signal arm 6 projects inwardly of the pivotal mounting 5 and with the arm 6 in normally inoperative position, the extension arm 14 is vertically disposed between the upright legs of the bracket guides 3. A link 15 pivotally connects the free end of the extension arm 14 as at 16 to the upper end 17 from the rod 18, the rod 18 being vertically shiftable in the tubular windshield post 1 and working through a partition 19 provided in said post forming a abutment for the spring 20 surrounding said post, with the spring being confined between the partition 19 and the stop 21 secured adjacent the upper end of the rod 18. A flexible cable or cord 22 is connected to the lower end of the rod 18 as shown in Fig. 9 and extends from the windshield post 1 rearwardly of the instrument board A to the opening 13 provided in the box 7 and is secured at its end as at 23 to the free end of the arm 12. It will therefore, be seen that by shifting the operating handles 10 for rotating the posts 9 that the arms 12 will pull upon the flexible cables 22 and also the rod 18 in the tubular post 1 against the tension of the spring 20 and through the link connection 15 with the signal arm 6, will elevate the signal arm to the horizontal position illustrated in Fig. 9.

In order to maintain the signal arm 6 horizontally positioned, stop devices are associated with the operating handles 10 and include as more clearly illustrated in Figs. 5 to 8, a resilient strip 24 carried by the upper face of the cover 8 and secured thereto as at 25, the free ends of the resilient strips 24 being normally elevated above the casing cover 8 as illustrated in Figs. 6 and 7. A latch device coöperating with the resilient strips 24 includes a push pin 26 slidable through an upstanding boss 27 formed on the casing cover 8 and carried upon the lower end of said push pin within the casing 7 is a cross head 28 maintained elevated in contact with the lower face of the casing cover by the spring finger 29. An angle lever 30 is pivotally connected as at 31 to each end of the cross head 28 and has a vertical leg 32 extending upwardly through the casing cover 8 for attachment to the overlying end of the resilient strip 24. The angle levers 30 are pivoted to the cross head 28 in a manner to permit independent lowering movement of the resilient strips 24 without effecting the position of the push pin 26, while a lowering movement of the pin 26 simultaneously lowers both levers 30 and with said levers, the resilient strips 24. To move the signal arms 6 in the horizontal position indicated by full lines in Fig. 9, the operating handles 10 in passing over the resilient strips 24 will lower the strips and by passing therebeyond as illustrated by dotted lines in Fig. 5, the strip 24 will be automatically elevated and the arm 10 maintained in rear of the angle lever leg 32, said arm 10 being maintained tensioned in contact therewith by the spring 20 within the tubular post 1. To effect a release of the signal arm 6 to permit the same to fall to its inoperative vertical position, the push pin 26 is pressed into the casing 7 and simultaneously moves the angle levers 30 to lower the elevated ends of the resilient strips 24 to permit the spring 20 surrounding the rod 18 to move said rod vertically within the tubular post 1 and to return the operating handles 10 to the full line positions shown in Fig. 5. As a means for preventing undue vibratory movements of the signal arms 6, spring fingers 33 carried by the tubular posts 1 frictionally engage the plane face of the signal arm 6 as illustrated in Figs. 11 and 12.

When the device is to be employed during the night, the lamp 34 contained within the box 35 at the outer end of the signal arm 6 is illuminated. A pair of insulated blocks 36 arranged within the box 7 carries spaced contact points 37 which are connected with the feed circuit wires 38 extending from the storage battery of the car. The wires 39 extend from the blocks 36 through the openings 38 and in a convenient manner through the tubular posts 1 and the tubular sections 6' carried by the signal arms 6 to the sockets of the lamps 34. To effect a closing of the circuit for illuminating the lamps 34, contact plates 40 are carried by and insulated from the arms 12, and when said arms 12 are moved with the posts 9 in response to the operation of the handles 10, the plates 40 bridge the contact points 32 to complete the circuit and illuminate the lamp 34, this illuminating of the lamp being simultaneous with the elevating movement of the arm 6 so that when said arm is elevated during darkness to indicate the direction of turn of the vehicle the lamp 34 will be illuminated to clearly show the position of the arm. The wires 38 from the battery being upon the main lighting system of the car, the lamps 34 will only be illuminated when the lights upon the car are employed, while during the day, the arms 6 will be elevated to the exclusion of the illuminating of the lamps 34.

From the above detailed description, it is believed that the construction and operation of the device will at once be apparent, it being noted that either of the signal arms 6 at the opposite sides of the windshield B may be elevated under the manual control of the operator to indicate the proposed change in direction of travel. The arm is maintained elevated as above described by the operating handle 10 being engaged by the leg 32 while the lowering of the leg effected by the operation of the push pin releases the operating handle 10 to permit the spring 20 to function in lowering the arm 6 and returning the operating handle to its initial position. Also, when the main lighting system of the automobile is in operation, the contacts 37 being bridged by the plates 40 will illuminate the lamp 34 when such contact is accomplished so that the signal arm will be illuminated during the night when raised to its operative horizontal position.

While there is herein shown and described, the preferred embodiment of the invention, it is nevertheless to be understood that minor changes may be made in the novel form, combination and arrangement of parts without department from the spirit and scope of the invention as hereinafter claimed.

What is claimed as new is:

1. A signal for automobiles comprising in combination the side rails of a wind shield frame, said side rails being hollow, a tensioned rod vertically movable in said side rails, a signal arm operatively connected to the upper end of said tensioned rod and means for lowering the rod against tension thereof for shifting the signal arm to a horizontal signaling position.

2. A signal for automobiles including in combination with a wind shield frame having hollow side rails, said rails provided with longitudinal slots, a tensioned rod vertically movable in said side rails and through said slots, a signal arm operatively connected to the upper end of said tensioned rod, means within the rail for lowering the rod against the tension thereof to shift the signal arm to its operative position, said means including a casing, shiftable means within said casing, and connections between said tensioned rod and shiftable means.

3. A signal for automobiles including the combination with the frame of a wind shield, said frame having hollow side rails provided with longitudinal slots, a tensioned rod vertically movable in said side rails and out through said slots, a signal arm operatively connected to the upper end of said tensioned rod, means for lowering the rod against the tension thereof to shift the signal arm to its signaling position, said means including a casing, rotatable shifting means within the casing, connections between said tensioned rod and shiftable means, manually operable means for said shiftable means and means for holding the manually operable means in operative position.

4. A signal for automobiles comprising a hollow post having longitudinal slots therein, a rod vertically movable in said post, a spring surrounding and connected to said rod, a link pivotally connected to the upper end of said rod movable vertically within said post and outwardly through said slots, a signaling arm pivoted to the upper end of said rod and to the post, and flexible means connected to said rod whereby the signal may be raised to horizontal signaling position against the tension of said spring.

In testimony whereof I affix my signature.

MARYAN A. JASZEWSKI.